United States Patent [19]

Riccitiello et al.

[11] Patent Number: 4,676,962

[45] Date of Patent: Jun. 30, 1987

[54] PREPARATION OF B-TRICHLOROBORAZINE

[75] Inventors: Salvatore R. Riccitiello; Ming-Ta S. Hsu; Timothy S. Chen, all of San Jose, Calif.

[73] Assignee: The United States of America as represented by the Administrator of the National Aeronautics and Space Administration, Washington, D.C.

[21] Appl. No.: 901,496

[22] Filed: Aug. 28, 1986

[51] Int. Cl.[4] .............................................. C01B 35/14
[52] U.S. Cl. ..................................... 423/284; 423/276
[58] Field of Search ................ 423/284, 285, 286, 287

[56] References Cited

U.S. PATENT DOCUMENTS 2,754,177 7/1956 Gould ................................ 423/285
4,578,283 3/1986 Kirtley et al. ......................... 427/85

OTHER PUBLICATIONS

Earl L. Muettries, editor, *Boron Hydride Chemistry,* Academic Press, New York (1975), pp. 248, 270.
Charles A. Brown et al., "B-Trichloroborazole", J.A.C.S. 77, 3699 (1955).

*Primary Examiner*—John Doll
*Assistant Examiner*—Jackson Leeds
*Attorney, Agent, or Firm*—Darrell G. Brekke; John R. Manning; Robert D. Marchant

[57] ABSTRACT

The present invention relates to a method of preparing B-trichloroborazine, $B_3N_3Cl_3H_3$. Generally, the method includes the combination of gaseous boron trichloride in an anhydrous aprotic organic solvent followed by addition of excess gaseous ammonia at ambient temperature or below. The reaction mixture is heated to between about 100° to 140° C. followed by cooling, removal of the solid ammonium chloride at ambient temperature, distillation of the solvent under vacuum if necessary at a temperature of up to about 112° C., and recovery of the B-trichloroborazine. Solvents include, toluene, benzene, xylene, chlorinated hydrocarbons, chlorinated aromatic compounds, or mixtures thereof. Toluene is a preferred solvent. The process provides a convenient synthesis of a material which often decomposes on standing. B-trichloroborazine is useful in a number of chemical reactions, and particularly in the formation of high temperature inorganic polymers and polymer precursors.

19 Claims, No Drawings

PREPARATION OF B-TRICHLOROBORAZINE

Origin of the Invention

The invention described herein was made in the performance of work under a NASA Contract and is subject to Public Law 96-517 (35 U.S.C. §200 et seq.). The contractor has not elected to retain title in the invention.

BACKGROUND OF THE INVENTION

1. Field of the Invention

This invention relates to a novel and useful preparation of B-trichloroborazine, a compound useful, for instance, in the formation of specialty inorganic polymers. More specifically, the present invention relates to the preparation of B-trichloroborazine at elevated temperatures using ammonia and boron trichloride in a suitable solvent.

2. Description of the Prior Art

B-trichloroborazine ($B_3N_3Cl_3H_3$, also known as B-trichloroborazole) has long been recognized as a desirable reagent for the preparation of a large number of borazine derivatives, including borazine (borazole) itself, and due to its polyfunctionality it is also considered to be a most excellent starting material for the synthesis of high stability inorganic polymers. However, in spite of the many desirable properties of B-trichloroborazine, its straightforward preparation from boron trichloride and ammonia has not been disclosed.

The preparation of B-trichloroborazine by a number of routes has been reported. These include, for example, P. A. Tierney, who disclosed in the Abstracts of the 141st Annual Meeting of the American Chemical Society held in Washington, D.C., Mar. 20–29, 1962, [Abstract 13, Division of Inorganic Chemistry] that the reaction of boron trichloride and ammonia-produced ammonium chloride, $NH_4Cl$, and dichloroboronamide, $Cl_2BNH_2$, which on heating decomposed to produce hydrogen chloride, HCl and BN. No evidence for the formation of B-trichloroborazine was obtained in any reactions involving less boron trichloride than is in $BCl_3.2NH_3$. Mixtures of $BCl_3.2NH_3$ and $BCl_3$ were reported as forming B-trichloroborazine under the same conditions generally used for its synthesis from boron trichloride and ammonium chloride. However, these synthesis methods were not described in detail in any later publication of Tierney or others.

G. L. Brennan et al., in the *Journal of the American Chemical Society,* Vol. 82, p. 6248, published in 1950, disclose the preparation of B-trichloroborazine by passing boron trichloride through a column of ammonium chloride at 200° C., which produced a 40 percent yield.

E. F. Rothgery et al., in *Inorganic Chemistry,* Vol. 6, No. 5, p. 1065, published in 1967, disclose the preparation of B-trichloroborazine by the combination of boron trichloride and methyl cyanide in chlorobenzene. Ammonium chloride is added and the mixture is refluxed for 2.5 hr to give soluble products. The solvent is removed by vacuum distillation, and the pasty residue was sublimed to give B-trichloroborazine.

D. F. Gaines and Jorgan Borlin in "borazines" (Chapter 7), as found in *Boron Hydride Chemistry* by Earl L. Muetterties (Ed.), Academic Press, New York, NY, published in 1975, disclose the preparation of B-trichloroborazine using ammonium chloride and boron trichloride. This reference discloses, without experimental details, that yields of B-trichloroborazine from ammonia and boron trichloride are very low, but 50 percent yields of $Cl_3B_3N_3H_3$ (B-trichloroborazine) are obtained using ammonium chloride rather than ammonia itself.

In the *Journal of the American Chemical Society,* Vol. 76, 3303 (1954), R. Schaeffer et al. disclose the preparation of B-trichloroborazine using ammonium chloride dissolved in chlorobenzene with specially prepared ground glass heated to 140°–150° C. Boron trichloride is added in excess slowly over a five-hour period. Then excess boron trichloride is allowed to distill off. The reaction mixture is cooled and the supernatant liquid is removed and centrifuged to collect the solids. The centrifugate is separated by fractional distillation to produce a liquid and crude solid B-trichloroborazine which is purified by vacuum sublimation at about 50°–60° C. initially, about a 40 percent yield of B-trichloroborazine is produced. After two or three repetitions of adding additional boron trichloride and ammonium chloride, yields approach 90 percent. Tribromoborazine was prepared in an analogous method to the one used for the chloro-derivative. The reference also discloses that the yields in both steps of the method, i.e., the preparation of trichloroborazole (trichloroborazine) and its reduction to borazole are greatly dependent upon the techniques and conditions employed.

C. A. Brown et al., in "B-Trichloroborazole" (B-trichloroborazine) in the *Journal of the American Chemical Society,* Vol. 77, pp. 3699–3700, published in 1955, disclose the preparation of B-trichloroborazine using boron trichloride and ammonium chloride at temperatures above 110° C. Two methods of production are described. In the first method, dry powdered ammonium chloride is placed in a long Pyrex combustion tube and heated to 165°–175° C. Boron trichloride in dry nitrogen is passed over the ammonium chloride and B-trichloroborazine condenses as crystals. Yields of about 35 percent based on the amount of unreacted ammonium chloride. In the second method, B-trichloroborazine is prepared by refluxing a mixture of chlorobenzene and ammonium chloride in the presence of boron trichloride vapor. Anhydrous ammonium chloride and anhydrous chlorobenzene are combined and heated to reflex temperature (130° C.). Boron trichloride in dry nitrogen is added over a ten hour period. The solvent is removed by filtration in the absence of moisture. The crude solid residue is purified by vacuum sublimation. A 36 percent yield of B-trichloroborazine is obtained based on unreacted ammonium chloride. The reference also discloses that little, if any, reaction of boron trichloride and ammonium chloride occurs below 110° C. Above this temperature, hydrogen chloride, B-trichloroborazine and non-volatile products are formed. Further, attempts to prepare B-trichloroborazine by the reaction of boron trichloride with ammonia gas resulted in only traces of the desired compound. In this case, the products were almost wholly white, non-volatile solids.

A United Kingdom No. 883,327, assigned to the United States Borax & Chemical Corporation, discloses a method of producing B-trichloroborazole which includes fluidizing a bed of ammonium bromide, fluoride, sulfate or orthophosphate particles by means of a substantially moisture-free gas and heating the bed until it is substantially completely moisture-free, charging the heated fluidized bed with substantially completely moisture-free boron trichloride gas, and condensing the B-trichloroborazine resulting from the reaction of the boron trichloride and the reactants cited above. The temperatures of the reaction are 120° C. to 350° C., and yields are of the order 70–80 percent. Also, see U.S. Pat. No. 3,030,174 for a similar process.

U.S. Pat. Nos. 3,394,999; 3,321,337; 3,261,378; 3,180,701; 3,018,307; and 2,996,491 disclose either the preparation, use or subsequent reaction of B-trichloroborazine, and are cited of general interest only. Finally, an overview of the preparation of boron-nitrogen compounds is found in "Organic Boron Nitrogen Compounds" by H. D. Smith, Jr. in *Kirk-Othmer: Encyclopedia of Chemical Technology,* Vol. 4, 3rd ed., pp. 188–201, published in 1978.

None of the above references disclose the present invention. As can be seen from the above-cited art, the attempted preparation of B-trichloroborazine from boron trichloride and ammonia has produced no reaction or only trace quantities of the expected product. It is therefore extremely desirable to have an easy and convenient preparation of B-trichloroborazine from boron trichloride and ammonia at ambient pressure and easily obtained temperatures.

SUMMARY OF THE INVENTION

The present invention relates to a useful preparation of B-trichloroborazine. More specifically, the present invention relates to a process for the preparation of B-trichloroborazine of the formula:

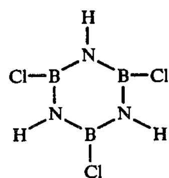

which includes:

(a) contacting an excess of gaseous ammonia at ambient temperatures or below with a solvent having a boiling point of between about 100° C. and 140° C.;
(b) treating the solution of step (a) with boron trichloride at about ambient temperature;
(c) heating the solution of step (b) to between about 100° C. to 140° C. for a time effective to produce B-trichloroborazine;
(d) cooling the product of step (c) to about ambient temperature and separating the precipitate of ammonium chloride;
(e) removing the solvent of the solution of step (d); and
(f) recovering the solid B-trichloroborazine of step (e).

In another embodiment, the present invention relates a process for the preparation of B-trichlorobenzene which includes:

(a) contacting gaseous boron trichloride with a aprotic polar organic solvent at ambient temperature or below;
(b) treating the solution of step (a) with at least two equivalents of gaseous ammonia at ambient temperature or below;
(c) heating the solution of step (b) to between about 100° C. to 140° C. for a time sufficient to evolve hydrogen chloride;
(d) cooling the mixture of step (c) to about ambient temperature and separating the precipitate of ammonia chloride from the solvent;
(e) removing the solvent of the solution of step (d); and
(f) recovering the solid B-trichloroborazine.

DETAILED DESCRIPTION OF THE INVENTION AND PREFERRED EMBODIMENTS

Broadly stated, the present invention comprises a method of producing B-trichloroborazine including the contacting boron trichloride and ammonia in a suitable solvent at a time a nd temperature effective to obtain B-trichloroborazine. More specifically, the present invention comprises the preparation of B-trichloroborazine by combining boron trichloride with at least a two-fold equivalent to about a three-fold excess of ammonia at between 100° C. and 140° C. in a solvent in which the ammonium chloride produced is insoluble and the reactants and B-trichloroborazine are soluble. After between about one and six hours of reaction, the reaction mixture is cooled, and the precipitated ammonium chloride is removed; the solvent is removed by distillation, and the solid B-trichloroborazine is recovered.

In this reaction between about 105° C. and 120° C. is a preferred reaction temperature, with between about 108° C. and 112° C. being more preferred. The time required for the reaction to proceed is generally between about one to ten hours, with between about one to three hours being preferred.

The solvents useful in this invention include chlorinated hydrocarbons, aromatic compounds, chlorinated aromatic compounds, or mixtures thereof. In this application, "solvent" refers to a single liquid chemical and also to a mixture of chemicals having solvent properties. The requirements for the solvent are that the boiling point at ambient pressure be between about 100° C. and 140° C. Further, the solvent or solvent mixture has the properties that the reactants, boron trichloride and ammonia, are soluble, as is the product, B-trichloroborazine. However, the ammonium chloride produced is generally insoluble in the reaction mixture in the range of about 100° C. to 140° C. The ratio of product-to-solvent (on a weight/weight basis) is between about 1/10 to 1/100, preferably between about 1/15 to 1/50, and more preferred is about 1/20. Suitable solvents for example, include toluene, xylene, chloroform, chlorobenzene, pentachloroethane, and perchloroethylene or mixtures thereof. Toluene, chlorobenzene, and xylene are preferred, with toluene being more preferred.

In a typical reaction, into a glass three-necked flask is added anhydrous toluene, 500 to 1000 ml. To this solvent is added the boron trichloride, about 100 g. Care is taken to keep the reaction mixture anhydrous. Ammonia is aded to the solvent which is kept at 0° or lower using a DRY-ICE bath. The flask has a DRY-ICE condenser upon which the ammonia refluxes. A flow of anhydrous nitrogen through the reactor aids in keeping the reaction mixture anhydrous. Ammonium chloride appears (as a solid) in the reaction mixture immediately after the addition of gaseous ammonia.

After the addition of the ammonia, the reaction mixture is heated at 100° C. to 140° C. until all of the hydrogen chloride is evolved, usually between about one to six hours. Temperatures of 105° C. to 120° C. are preferred, with 108° C. to 112° C. being preferred, and 110°–112° C. being especially preferred.

After refluxing, the reaction mixture is cooled to ambient temperature, and the solid ammonium chloride as a by-product is separated. Usually filtration or centrifugation is used, with filtration being preferred. The solvent or solvent mixture is then removed at between110° C. and 112° C. using reduced pressure if necessary to maintain this temperature range. The crude white solid obtained is B-trichloroborazine, which is purified by sublimation. The order of addition of the reactants generally is not important provided that at least a two-fold equivalent of ammonia is added. The preferred order of addition is to dissolve the boron trichloride in the solvent at ambient pressure, then add gaseous ammonia over a period of time.

Although not known with certainty and intending to be bound by theory, it is believed that the reactions occurring are as follows:

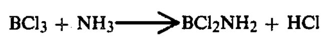

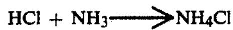

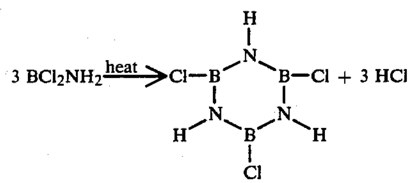

Thus, it is important that at least two equivalents of ammonia are present for each equivalent of boron trichloride.

The following Examples are to be construed as being illustrative and are not limiting in any way.

EXAMPLE 1

Preparation of B-Trichloroborazine

To a 1000 ml. three-necked flask fitted with a DRY-ICE condenser and nitrogen sweep adaptors was added 500 ml. of anhydrous toluene, which is degassed using a nitrogen stream for thirty minutes. Boron trichloride (87.0 ml, 117.5 g.) 1 mol, from Matheson Products was condensed into the toluene at below 0° C. Excess ammonia (greater than 2 mol) was condensed into the flask and ammonium chloride appeared immediately. After completion of the ammonia addition, the solution is hydrogen chloride evolved, about four hours. The reaction mixture is cooled, and the white solid obtained (ammonium chloride) is filtered and discarded. The toluene filtrate is then distilled at ambient pressure, and the white solid obtained identified by infrared spectroscopy as B-trichloroborazine, 24.5 g, 40 percent yield.

EXAMPLE 2

Use of Chlorobenzene as a Solvent

Similarly as is discussed above to Example 1, B-trichloroborazine is prepared using chlorobenzene rather than in toluene. The chlorobenzene is then removed using a vacuum while keeping the temperature at between about 110° C. to 112° C. A good yield of B-trichloroborazine is obtained.

While a few embodiments of the invention have been shown and described herein, it will be apparent to those skilled in the art that various modifications and changes can be made in the process to prepare B-trichloroborazine using boron trichloride and ammonia without departing from the spirit and scope of the present invention. All such modifications and changes coming within the scope of the appended claims are intended to be covered thereby.

We claim:

1. A process for the preparation of B-trichloroborazine of the formula:

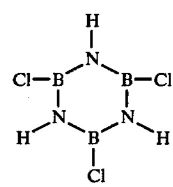

which process comprises:

(a) combining one equivalent of boron trichloride with at least two equivalents of ammonia at 0° C. or below in a solvent selected from chlorinated hydrocarbon compounds, aromatic compounds or mixtures thereof, wherein said solvent has a boiling point at ambient pressure of between about 100° C. to 140° C.;

(b) heating the mixture of step (a) to between about 105° C. to 112° C. for a time sufficient to evolve the hydrogen chloride produced;

(c) cooling the mixture of step (b) to about ambient temperature and separating the precipitate of ammonium chloride;

(d) removing the solvent or solvent mixture of step (c); and (e) recovering the B-trichloroborazine.

2. The process of claim 1 wherein in step (a) between about three and six equivalents of ammonia are combined.

3. The process of claim 2 wherein the solvent is a mixture of aromatic compounds.

4. The process of claim 2 wherein the solvent aromatic compound is toluene.

5. The process of claim 4 wherein in step (c) the precipitate is separated by filtration.

6. The process of claim 5 wherein in step (b) the time to evolve hydrogen chloride is between about 1 to 6 hr.

7. The process of claim 6 wherein in step (d) the solvent or solvent mixture is removed by distillation.

8. The process of claim 7 wherein the distillation proceeds at between about 110° C. and 112° C. at ambient pressure or below.

9. A process for the preparation of B-trichloroborazine of the formula:

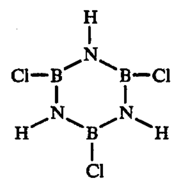

which process comprises:

(a) contacting gaseous boron trichloride with an aprotic, polar organic solvent at ambient temperature or below;

(b) treating the solution of step (a) with at least two equivalents of gaseous ammonia at ambient temperature or below;

(c) heating the solution of step (b) to between about 105° C. to 112° C. for a time sufficient to evolve hydrogen chloride;

(d) cooling the mixture to step (c) to about ambient temperature and separating the precipitate of ammonium chloride from the solvent;

(e) removing the solvent of step (d); and (f) recovering the B-trichloroborazine.

10. The process of claim 9 wherein the solvent in step (a) is toluene.

11. The process of claim 10 wherein the temperature in step (c) is between about 110° C. and 112° C.

12. The process of claim 11 wherein in step (c) the time is about 240 minutes.

13. The process of claim 9 wherein in step (c) the ratio of product to solvent is about 1 to 20.

14. The process of claim 9 wherein in steps (a) and (b) the temperature is below 0° C.

15. The process of claim 9 wherein in step (a) the solvent is selected from chlorinated hydrocarbons, chlorinated aromatic compounds, aromatic compounds, or mixtures thereof, having a boiling point between 105° C. and 140° C. at ambient pressure.

16. The process of claim 15 wherein the solvent is selected from toluene, xylene, or chlorobenzene.

17. The process of claim 16 wherein in step (d) the ammonium chloride is separated by filtration.

18. The process of claim 17 wherein the solvent is xylene.

19. The process of claim 17 wherein the solvent is chlorobenzene.

* * * * *